United States Patent [19]

Wissinger

[11] 4,395,013
[45] Jul. 26, 1983

[54] LANTERN HOLDER

[76] Inventor: Lawrence H. Wissinger, 337 Montgomery Ave., Springfield, Ohio 45506

[21] Appl. No.: 237,002

[22] Filed: Feb. 23, 1981

[51] Int. Cl.³ .................. F16M 13/00; A47K 1/08
[52] U.S. Cl. ............................. 248/558; 248/210; 248/311.2
[58] Field of Search .............. 248/558, 309 R, 310, 248/313, 311.2, 210, 211, 176, 226.4, 226.26; 362/431, 415, 399

[56] References Cited

U.S. PATENT DOCUMENTS

| | | | |
|---|---|---|---|
| 339,148 | 4/1886 | Chvala | 248/310 X |
| 2,655,337 | 10/1953 | Diesfeld | 248/310 |
| 2,759,620 | 8/1956 | Pharris | 248/211 X |
| 2,867,403 | 1/1959 | Graf | 248/310 |
| 3,199,818 | 8/1965 | Ahara | 248/156 |
| 3,725,696 | 4/1973 | Morton | 362/399 |

Primary Examiner—J. Franklin Foss

[57] ABSTRACT

The lantern holder is adaptable to all types of lanterns, and consists primarily of a base portion with a pair of legs on one end, with an elevatable plate on its opposite end, that retains an adjustable clamp member, for gripping a lantern base. It further includes a vertical member for the support of a height-adjustable reflector and shade combination, and also an oar lock mounting member for boats, and the assembly includes a clamp screw, for suitably securing the structure to various devices, such as a boat seat or the like, and it is also mountable to a stepladder, for clamping and retaining a can of paint, when desired.

2 Claims, 4 Drawing Figures

LANTERN HOLDER

This invention relates top devices for lanterns, and more particularly, to an improved lantern holder.

It is, therefore, the principal object of this invention to provide an improved lantern holder, which will be adaptable for safely clamping to a lantern base, so as to hold the lantern to various types of surfaces, such as seats, boat seats, oar locks of boats, etc.

Another object of this invention is to provide an improved lantern holder, which will include a base member, that will have an elevatable plate on one end, that will be fastened to an adjustable clamp ring, for clamping to the outer periphery of various sizes of lantern bases, so as to render the lantern stationary above the base of the holder.

Another object of this invention is to provide an improved lantern holder, which will have screw clamp means in the base, so as to secure a lantern safely to various types of surfaces, even the top of a stepladder, where the clamp ring of the structure will firmly hold a can of paint, when desired.

A further object of this invention is to provide an improved lantern holder, which will include a vertical and removable member, having a height-adjustable reflector and shade combination, for the lantern clamped within the assembly.

Other objects of the present invention are to provide an improved lantern holder, which is simple in design, inexpensive to manufacture, rugged in construction, easy to use and efficient in operation.

These, and other objects, will be readily evident, upon a study of the following specification, and the accompanying drawing, wherein.

Figure 1:
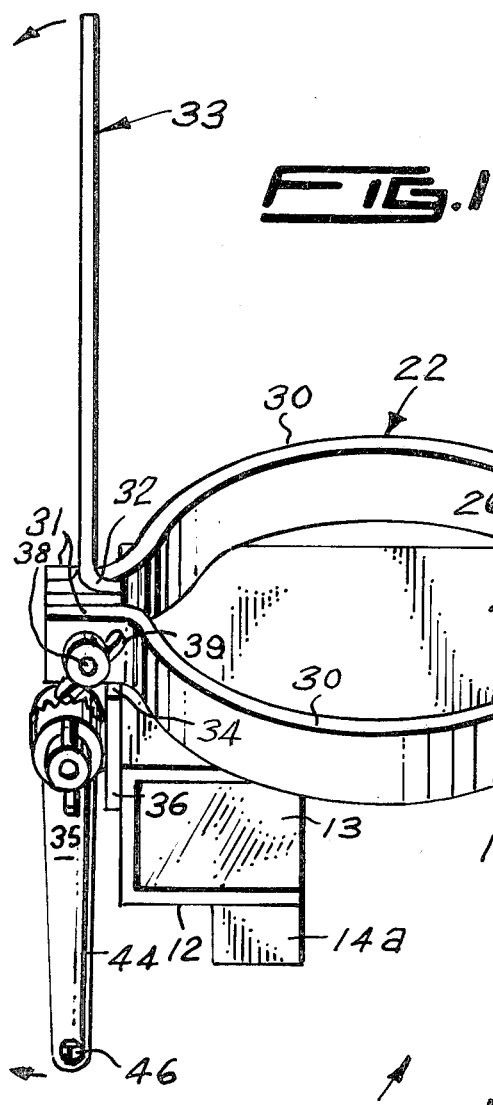
FIG. 1 is a perspective view of the present invention, showing the lantern, and the reflector-shade combination removed therefrom, for the sake of clarity.
Figure 2:
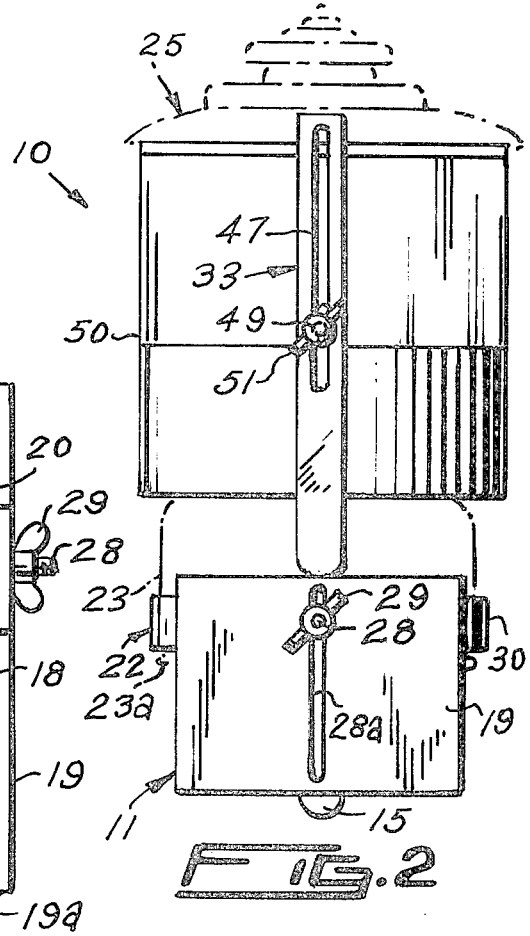
FIG. 2 is a right end view of FIG. 1, shown in elevation, on a smaller scale, and illustrates the reflector and shade combination partially encompassing a lantern, which is shown in phantom.
Figure 4:
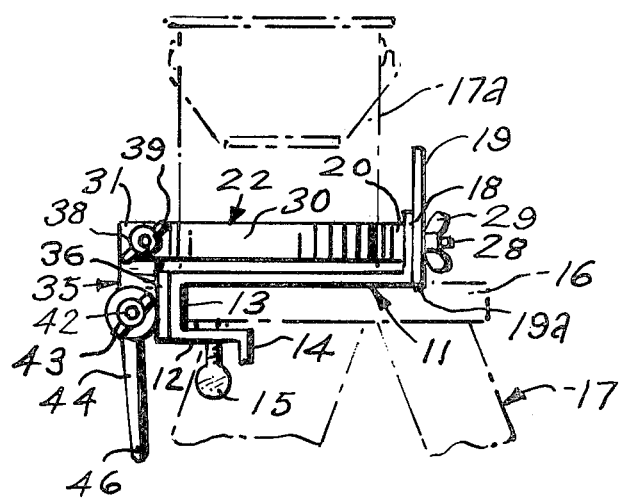
FIG. 4 is a fragmentary side elevational view of FIG. 1, shown on a smaller scale, and illustrates a paint can and a fragmentary stepladder, in phantom lines.
Figure 3:
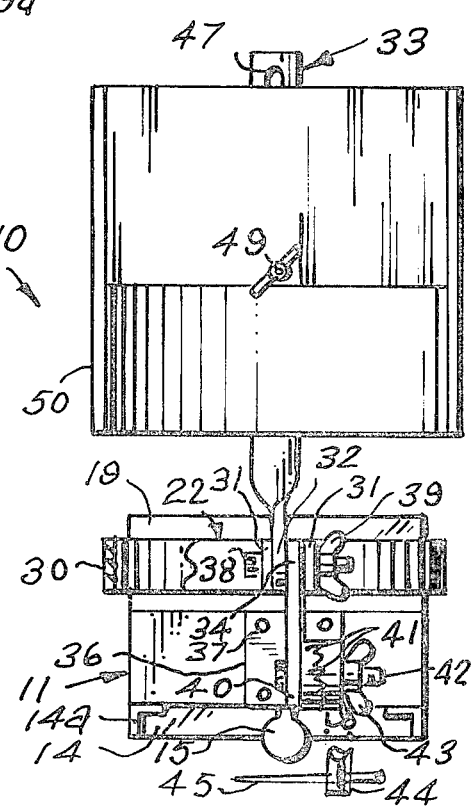
FIG. 3 is a front view of FIG. 2, similar in scale, but partly broken away, and shows the lantern removed therefrom.

According to this invention, improved holder 10 is shown to include a base 11, of suitable metal, having an end portion 12, with a horizontal opening 13 for receiving a suitable mounting means, such as a seat, a boat seat, etc. End portion 12 includes a downwardly projecting lip 14, for rigidity, and a pair of "L"-shaped legs 14a are spaced apart, and fixedly secured to the bottom of end portion 12, in a suitable manner. A clamp screw 15 is threaded into an opening (not shown) through end portion 12, so as to clamp holder 10 to one of the aforementioned means, or to the top of a stepladder 17, when holder 10 is used for holding a can 17a of paint or the like, as is illustrated in FIG. 4 of the drawing.

An upwardly extending lip 18, on the opposite end of base 11, is removably received against one side of a rectangular plate 19, and the lower edge 19a, of plate 19, may be brought level with legs 14a, so as to enable holder 10 to be rested upon a surface, such as a table, etc. A spacer washer or plate 20 is received between lip 18 and one end 21 of clamp ring 22, which serves as a means of clamping around the outer periphery 23 of the base 24 of a typical lantern 25. Ends 21 and 26 of clamp ring 22 overlap, and include an elongated horizontal opening 27 therethrough, for receiving the bolt fastener 28, which extends through ends 21 and 26, spacer 20, lip 18, and vertical slot 28a of plate 19, so as to receive wing nut fastener 29. The openings 27 (one of which is shown), enable clamp ring 22 to be adapted to fit lantern bases 23 of various diameters, or paint cans 17a of various diameters. The two halves 30, of clamp ring 22, are arcuate in configuration, so as to engage base 23a or paint can 17a properly, and are terminated, at their opposite ends by lips 31, which are removably held against one end 32 of upright member 33, and one end 34 of oar lock mounting member 35, that is fastened to plate 36, fixedly secured to end portion 12 by suitable fasteners 37. A bolt fastener 38 is received through lips 31 and 32, and end 34, so as to receive wing nut fastener 39. The opposite end 40, of member 35, has, fixedly secured to it, a serrated member 41, and a freely rotatable, similar member 41, which are held together, by means of a bolt fastener 42 and a wing nut fastener 43, so as to mount holder 10 to a boat, through means of fixed shank 44 on the outside member 41. The shank 44 is removably received in the opening of a boat oar lock (not shown), and a tapered retaining pin 45 is removably received in the end opening 46 of shank 44, for rendering holder 10 secure to a boat.

An elongated slot or opening 47, through the uppermost portion 48 of member 33, slidably received a bolt fastener 49, which is also received in an opening (not shown) through a partially semi-circular reflector and shade combination 50, and a wing nut fastener 51, received on fastener 49, enables the reflector and shade combination 50 to be raised or lowered to any desired elevation.

In use, the bases 28a of lantern 25 is placed within the clamp ring 22, the wind nut 25 is tightened, and the halves 30 will clamp against the outer periphery of lantern base 23a. If, in the event the base 23a is smaller, the halves 30 are closed further together by the user's hands before tightening the wing nut fastener 29. The elevation of the plate 19 is also controlled by wing nut fastener 51, so as to obtain maximum effectiveness of the light emitted by lantern 25. The clamp screw 15 is used, in the usual manner, to tighten base 11 to any object desired, such as a seat, boat seat, etc. When desired for mounting to a gunwale of a boat, the shank 44 is placed in the oar lock, the pin 45 inserted in the opening 46, and the angle of the holder 10 setting is controlled, by means of the wing nut fastener 43.

When setting holder 10, for retaining a can of paint 17a or the like, member 33 is removed therefrom, the plate 19 raised, and end portion 12 is secured to the top 16 of a stepladder 17, or other fixture, by means of clamp screw 15, as illustrated in FIG. 4 of the drawing.

While various changes may be made in the detail construction, it is understood that such changes will be within the spirit and scope of the present invention, as is defined by the appended claims.

What I now claim is:

1. A lantern holder, comprising, in combination, a base, a split-clamp ring secured to said base for clamping onto the outer periphery of a lantern base, an upright member secured to said split-clamp ring, for removably supporting an elevatable light reflector and shade combination, and a clamp screw received in said base for clamping said base to an object, such as a seat or ladder top, said base is open, on one end, to receive the longitudinal side edge of a seat, and a lip formed and extending downwards from said open end, includes a pair of spaced-apart legs fixedly secured thereto, and said legs, said lip, and a plate secured to the opposite end of said base, forms surface rest means, for said base, when said base is not clamped to an object, and said split-clamp ring comprises two arcuately curved valves, one pair of ends including an elongated horizontal slot for freely receiving a bolt fastener, which is received through a spacer, said opposite end of said base and said plate, which is elevated when said holder is to be mounted to the top of a ladder.

2. The combination according to claim 1, wherein the opposite pair of ends of said pair of halves are removably secured to said upright member at its lower end, and are secured to the upper portion of an oar lock member, by a bolt fastener, which receives a wing nut fastener.

* * * * *